United States Patent [19]

Chaundy et al.

[11] Patent Number: 5,738,805
[45] Date of Patent: Apr. 14, 1998

[54] PROCESS FOR SOLUBILIZING GLUTEN THAT NORMALLY IS CAPABLE OF ABSORBING WATER WITHOUT DISSOLUTION

[75] Inventors: Frederick K. Chaundy, Grosse Ile; Scott P. Melidosian, Allen Park; Jeffrey L. Finnan, Dearborn, all of Mich.

[73] Assignee: BASF Corporation, Mount Olive, N.J.

[21] Appl. No.: 706,760

[22] Filed: Sep. 3, 1996

Related U.S. Application Data

[63] Continuation-in-part of Ser. No. 363,028, Dec. 23, 1994, abandoned.

[51] Int. Cl.$^6$ ............... B01J 13/00; B01J 8/00; B01F 3/00; A23L 1/05
[52] U.S. Cl. ............. 252/311; 252/363.5; 426/573; 426/577; 426/578
[58] Field of Search ............. 252/311, 363.5; 426/573, 577, 578

[56] References Cited

U.S. PATENT DOCUMENTS

| | | | |
|---|---|---|---|
| 1,989,758 | 2/1935 | Linn | 99/11 |
| 2,097,224 | 10/1937 | Green | 99/25 |
| 3,498,965 | 3/1970 | Fellers | 26/112 |
| 3,873,736 | 3/1975 | Palmer et al. | 426/92 |
| 4,143,171 | 3/1979 | Buckley et al. | 426/331 |
| 5,100,688 | 3/1992 | Cox et al. | 426/573 |
| 5,211,976 | 5/1993 | Cox et al. | 426/248 |
| 5,215,756 | 6/1993 | Gole et al. | 424/484 |
| 5,219,599 | 6/1993 | Cox et al. | 426/104 |

*Primary Examiner*—Sharon Gibson
*Assistant Examiner*—Deanna Baxam
*Attorney, Agent, or Firm*—Joanne P. Will

[57] ABSTRACT

An improved technique is provided that is capable of accomplishing the expeditious dissolution of gluten (e.g., vital wheat gluten or corn gluten) in water that normally is capable of absorbing water without dissolution. An effective solubilizing concentration of a polysaccharide that contains uronic acid residues is dissolved in the aqueous solvent when contacted with agitation with the gluten component at an elevated temperature. The formation of a substantially homogeneous aqueous solution of the gluten is accomplished with ease without the necessity to resort to the introduction of acids, bases, enzymes, or other solvents as practiced in the prior art. The resulting aqueous solution of gluten is completely edible and is suitable for the controlled uniform introduction of such gluten into association with a variety of food products where it can serve a binding, adhesive, microencapsulation, film-forming, and/or coating function.

14 Claims, No Drawings

PROCESS FOR SOLUBILIZING GLUTEN THAT NORMALLY IS CAPABLE OF ABSORBING WATER WITHOUT DISSOLUTION

The present application is a continuation-in-part (CIP) of the parent case, U.S. Ser. No. 08/363,028, filed Dec. 23, 1994, now abandoned in favor of the present CIP application.

FIELD OF THE INVENTION

The present invention relates to a process for solubilizing gluten comprising contacting said gluten with a polysaccharide that contains uronic acid residues

BACKGROUND OF THE INVENTION

Gluten is recognized to be an edible film-forming material that is derived from cereal grains. Such gluten commonly consists of a water-insoluble complex protein fraction that is separated from a cereal grain following grinding. Gluten commonly is derived from cereal grains such as wheat or corn by known techniques and is a commercially available article of commerce that finds a broad range of applications in the food and related industries. The separation of the gluten commonly is accomplished by physical means from an aqueous suspension of the ground grain without the introduction of additives, and the resulting gluten product is thus a natural food protein of plant origin. The inherent cohesiveness and elasticity of gluten provide integrity to various doughs, and facilitate protective film formation. Such films can serve to improve the appearance of food products and to retard aging through the blockage of excessive drying to thereby extend shelf life with the concomitant maintenance of an attractive product appearance.

Vital wheat gluten is well known and is approved by the U.S. Food and Drug Administration as Generally Recognized as Safe (GRAS) under 21 C.F.R. §184.1322 for use as a dough strengthener, formulation aid, nutrient supplement, processing aid, stabilizer and thickener, surface finishing agent and texturizing agent at levels not to exceed current manufacturing practice.

See, for instance, "Wheat Gluten, A Natural Protein for the Future-Today" that is published and presently available from the International Wheat Gluten Association, 4510 West 89 Street, Prairie Village, Kans. 66207, U.S.A.

Additional representative publications that discuss gluten and its end uses are identified below. These are herein incorporated by reference.

1. "Edible Films and Coatings from Wheat and Corn Proteins" by Aristippos Gennadios and Curtis L. Weller, *Food Technology*, Pages 63 to 69 (October 1990).
2. "Uses and Functionality of Vital Wheat Gluten," by Ken M. Magnuson, *Cereal Foods World*, pages 179 to 181 (February 1985).
3. "Acts as Formulation Aid, Processing Aid, Stabilizer, Thickener, and Surface-Finishing Agent", by Cal Andres, *Food Processing* (May 1984).
4. "A Comparison of Nonmeat Proteins, Sodium Tripolyphosphate and Processing Temperature Effects on Physical and Sensory Properties of Frankfurters", by J. T. Keeton, E. A. Foegeding, and C. Patana-Anake, *Journal of Food Science*, Vol. 49, Pages 1462 to 1466 (1984).
5. "Structure & Tolerance a Look at Gluten's Functionality", by Laurie Green, *Bakers Digest*, (May 31, 1985).
6. "World Food Uses of Vital Wheat Gluten", by J. M. Hesser, *Proceedings of the World Congress*: Vegetable Protein Utilization in Human Foods and Animal Feedstocks, edited by Thomas H. Applewhite, American Oil Chemists' Society, Champaign, Ill., U.S.A., Pages 116 to 122 (1988).
7. "Preparation of Vital Wheat Gluten", by G. Grace, *Proceedings of the World Congress:* Vegetable Protein Utilization in Human Foods and Animal Feedstocks, edited by Thomas H. Applewhite, American Oil Chemists' Society, Champaign, Ill., U.S.A., Pages 112 to 115 (1988).

It has been recognized that gluten commonly has the ability to absorb water without dissolution unless an acid, base, enzyme, or solvent (e.g., propylene glycol) is employed. See, for instance, U.S. Pat. Nos. 3,351,531 and 3,653,925, "Water and Glycol as Plasticizers Affect Mechanical and Water Vapor Barrier Properties of an Edible Wheat Gluten Film", by Nathalie Gontard, Stephanie Guilbert, and Jean-Louis Cuq, *Journal of Food Science*, Vol. 58, Pages 206 to 211 (1993), and "Improvement of the Functional Properties of Insoluble Gluten by Pronase Digestion Followed by Dextran Coagulation", by Akio Kato, *J. Agric, Food Chem.*, Vol 39, Pages 1053 to 1056 (1991). Representative acids and bases that have been suggested to accomplish the dissolution of gluten in water include ammonium hydroxide (ammonia), acetic acid, adipic acid, ascorbic acid, aspartic acid, citric acid, lactic acid, succinic acid, tartaric acid, etc. The requirement to introduce such acids and bases in order to solubilize gluten is inconvenient and may introduce an undesirable component into the final product unless a significant effort is made to remove the same. For instance, such solubilizing agents may be flashed off to at least to some degree during drying. However, this can lead to further complications, such as the pollution of the atmosphere, and the possible exposure of workers in the area to a harmful environment. Accordingly, a need has remained in the prior art for an improved technique to solubilize gluten.

It is an object of the invention to provide an improved process to solubilize gluten in water.

It is an object of the invention to provide an improved process to solubilize gluten in water that does not require the presence of acids or bases as practiced in the prior art to achieve the dissolution of the gluten.

It is an object of the invention to provide an improved process that facilitates the expeditious dissolution of gluten in water.

It is another object of the invention to provide a process for the production of a substantially homogeneous aqueous solution of gluten that can be utilized to advantage in binding, adhesive, microencapsulation, film-forming, and/or coating applications.

It is further object of the invention to provide an improved technique for the formation of an aqueous solution of gluten suitable for use in the controlled uniform introduction of such gluten into association with a variety of food products where it serves a binding, adhesive, microencapsulation, film-forming and/or coating function.

These and other objects and advantages of the claimed invention will be apparent to those skilled in the relevant art from the following detailed description and appended claims.

Definitions and Usages of Terms

Uronic Acid—Any of a class of compounds similar to sugars but differing from them in that the terminal carbon has been oxidized from an alcohol to a carboxyl group. Thus, a uronic acid is a monosaccharide carboxylic acid. The most common uronic acids are galacturonic acid and glucuronic acid although others based on aldohexoses do exist such as mannuronic and guluronic acids. A number of polysaccharides contain these monosaccharide units of uronic acids and are referred to as polysaccharides that contain uronic acid residues. Some polysaccharides are almost totally composed of uronic acid residues and can be referred to as polyuronic acids such as pectin and algin, where as, other polysaccharides are composed of other sugars along with some uronic acid residues. Examples of these are gum tragacanth, gum ghatti, and gum arabic.

SUMMARY OF THE INVENTION

It has been found that an improved process for solubilizing gluten that normally is capable of absorbing water without dissolution in water (e.g., vital wheat gluten or corn gluten) comprises contacting the gluten with agitation with water at an elevated temperature having an effective solubilizing concentration of a polysaccharide that contains uronic acid residues, of which pectin is an example, dissolved therein. The presence of conventional acids, bases, enzymes, or solvents to facilitate dissolution of the gluten as practiced in the prior art is rendered unnecessary.

DESCRIPTION OF PREFERRED EMBODIMENTS

The gluten which is solubilized in accordance with the concept of the present invention is derived from a cereal grain and normally is capable of absorbing water without dissolution. Representative cereal grains from which the gluten can be derived include wheat, and corn. In a preferred embodiment the gluten is vital wheat gluten. Such vital wheat gluten is commercially available as a creamy-tan powder produced from wheat flour by drying freshly washed gluten. For instance, vital wheat gluten can be obtained from Ogilvie Mills, Inc., Baker Technology Plaza, 6121 Baker Road, Suite 101, Minnetonka, Minn. 55345, U.S.A., under the PROVIM ESP and WHETPRO - 80 trademarks. Alternatively, corn gluten (zein) is similarly commercially available from Freeman Industries, Inc., 100 Marbledale Road, Tuckahoe, N.Y. 10707, U.S.A., and can be solubilized in accordance with the concept of the present invention.

When the gluten is contacted with water in the absence of pH adjustment as practiced in the prior art, it absorbs water and is essentially insoluble over moderate pH ranges. Excess water is repelled and the gluten molecules tend to associate closely together and to resist dispersion in an aqueous solvent.

In accordance with the concept of the present invention it surprisingly has been found that gluten can readily be dissolved in water with agitation in the presence of an effective solubilizing concentration of a polysaccharide that contains uronic acid residues. The viscosity of the resulting gluten solution will be influenced by the nature of the specific polysaccharide that contains uronic acid residues that is utilized to dissolve the gluten. Also, some polysaccharides that contain uronic acid residues are better able to withstand an increase in viscosity in the presence of other ions (e.g., calcium ions) as will be apparent to those skilled in the art. The low methoxyl pectins are more sensitive to the presence of polyvalent cations (e.g., $Ca^{++}$) than high methoxyl polysaccharides that contain uronic acid residues, and the total soluble solids level is less important in determining gelling properties with such polysaccharides that contain uronic acid residues.

The viscosity of the gluten/polysaccharide that contains uronic acid residues solution can be lower or higher depending on the application. Generally the lower the viscosity the less water that is required. This is important if the solution is to be spray dryed since the water is being removed. The lower methoxyl pectins typically have lower viscosity. But, the lower methoxyl pectins are sensitive to calcium gelling which is useful in some cases, such as where one wants a higher viscosity possibly when spraying on a film.

Solubilizing gluten with a polysaccharide that contains uronic acid residues offers the further advantage that it is edible and no further effort need be expended for its removal as commonly is necessary with the acids, bases, enzymes, and solvents utilized to facilitate gluten dissolution in the prior art. Any water-soluble polysaccharide that contains uronic acid residues may be utilized to facilitate the dissolution of gluten when practicing the present invention. Suitable polysaccharides that contain uronic acid residues include, but are not limited to pectin, algin (e.g. sodium alginate), gum arabic, gum tragacanth, gum karaya, gum ghatti, xanthan gum and gellan gum, seed mucilages and microbial gums. A preferred polysaccharide that contains uronic acid residues may be a low methoxyl pectin. In a preferred embodiment the polysaccharide that contains uronic acid residues is a low methoxyl pectin that optionally may be amidated. For example, a polysaccharide that contains uronic acid residues suitable for use in accordance with the present invention is a low methoxyl amidated pectin extracted from the rind of citrus fruits that is commercially available from TIC Gums, 4609 Richlynn Drive, Belcamp, Md. 21017, U.S.A., under the TIC PRETESTED PECTIN LM 35 trademark. A preferred high methoxyl pectin is available from the same source under the TIC PRETESTED PECTIN HM SLOW trademark that offers considerably slower gelation than the low methoxyl pectin. In this product some of the carboxyl groups are esterified with methyl alcohol, while the remaining carboxylic units exist in the free acid form or as an ammonium salt. The polysaccharide containing uronic acid residues choice is influenced by the speed of gelation that is desired in the contemplated end use. Sugar sources optionally can be included with the polysaccharide containing uronic acid residues so as to modify the speed of gelation and the resulting viscosity as will be apparent to those skilled in the relevant technology.

A particularly suitable polysaccharide that contains uronic acid residues for use in accordance with the present invention is readily available, sea weed-derived algin typically sold as the salt, sodium alginate, is composed of $\beta$-1,4 linkages of mannuronic acid. Algin typically contains a guluronic acid residues in addition to the mannuronic acid residues. It was found to be capable of solubilizing gluten at two-thirds the level required with pectin.

The Process of the Present Invention

When accomplishing the dissolution of gluten in water in accordance with the concept of the present invention, one need only contact the gluten with agitation with water at an elevated temperature having an effective concentration of a polysaccharide that contains uronic acid residues dissolved therein. Such agitation can be accomplished by any convenient means such as the use of a high shear mixer, homogenizer, etc. The aqueous solvent conveniently can be provided at an elevated temperature of at least approximately 40° C. at the time of the dissolution (e.g., at a temperature of approximately 40° to 60° C. in preferred embodiments).

In accordance with the concept of the present invention, the polysaccharide that contains uronic acid residues commonly is provided in the water in an effective solubilizing concentration of approximately 1 to 10 percent by weight of the total solution, and preferably in a concentration of approximately 1 to 3 percent by weight of the total solution. The gluten commonly is dissolved in the water in a concentration of approximately 1 to 26 percent by weight of the total solution, and preferably in a concentration of approximately 19 to 22 percent by weight of the total solution.

The resulting aqueous solution is substantially homogeneous in nature and is suitable for use in the controlled, uniform introduction of gluten into association with a variety of products. Once the solution of the gluten is applied, a portion of the aqueous component, optionally, can be simply removed by volatilization in order to leave behind a hydrated gluten component that exhibits highly attractive binding, adhesive, microencapsulation, film-forming, and/or coating properties. For instance, edible protective films can be formed on the surfaces of food products such as meats, fruits, etc., by spraying or other application techniques in order to retard the loss of moisture and to thereby enhance the overall appearance of the product that is being offered to the consumer. The resulting solution alternatively may be utilized to introduce the gluten into good products, such as doughs for breads, tortillas, pizzas, and pastas; sausages; breakfast cereals; nutritional snacks; protein fortified beverages; pet foods, etc. There are further non-food applications in cosmetics, pharmaceutical tablet formations, wallpaper adhesives, etc. Additionally, the resulting solution offers the potential for forming a product via the spray drying of the dissolved gluten in conjunction with other components where it serves the function of a binding agent and/or as a nutritional supplement. For instance, the resulting solution also can be used in the microencapsulation of water-soluble or fat-soluble oils or vitamins (e.g., vitamin A) or other ingredients via spray drying.

The following Examples are presented as specific illustrations of the invention. It should be understood, however, that the invention is not limited to the specific details set forth in the Examples that follow.

EXAMPLE I

Initially 2 grams of low methoxyl amidated pectin commercially available from TIC Gums, Inc. Under the TIC PRETESTED PECTIN LM 35 trademark are dissolved with stirring in 160 grams of water provided at 40° C. The pectin solution is placed in a high shear mixer and agitation is commenced. To the pectin solution next is gradually added 40 grams of vital wheat gluten commercially available from Ogilvie Mills, Inc. Under the WHETPRO-80 trademark while maintaining the temperature between 40° and 50° C. A substantially homogeneous solution results within approximately 15 minutes that contains approximately 20 percent by weight of the vital wheat gluten, and approximately 1 percent by weight of the low methoxyl amidated pectin based upon the total weight of the solution.

The resulting vital wheat gluten solution is well suited for forming a protective film upon a food product following the volatilization of a substantial portion of the aqueous component.

EXAMPLE II

Example I is repeated with the exception that high methoxyl pectin available from TIC Gums, Inc. under the TIC PRETESTED PECTIN HM SLOW trademark is substituted for the low methoxyl amidated pectin. Substantially the same dissolution results are achieved.

EXAMPLE III

Example I is repeated with the exception that zein corn gluten is substituted for the vital wheat gluten component. The corn gluten is commercially available as zein from Freeman Industries, Inc. Substantially the same dissolution results are achieved.

Although the invention has been described with preferred embodiments, it is to be understood that variations and modifications may be resorted to as will be apparent to those skilled in the art. Such variations and modifications are to be considered within the purview and scope of the claims appended hereto.

EXAMPLE IV

Two grams of Kelgin® XL Algin from Kelco, which is actually sodium alginate, were dissolved with stirring in 170 grams of water provided at room temperature. The algin solution was placed in a high-shear mixer and agitation was commenced. To the algin solution next was gradually added 40 grams of vital wheat gluten commercially available from Ogilvie Mills, Inc. under the WHETPRO-80 trademark. The temperature was allowed to rise due to the energy input of mixing. When the temperature reached 35° C., the gluten became soluble. Other examples are shown in the table above.

EXAMPLE V 16.7 grams of TIC PRETESTED GUM ARABIC FT SPRAY DRY POWDER from TIC Gums, Inc. were dissolved with stirring in 170 grams of water provided at room temperature. The gum arabic solution was placed in a high-gear mixer and agitation was commenced. To gum arabic solution next was gradually added 40 grams of vital wheat gluten commercially available from Ogilvie Mills, Inc. under the WHETPRO-80 trademark. The temperature was allowed to rise due to the energy input of mixing. When the temperature reached 30° C., the gluten became soluble. Other examples are shown in the table below.

EXAMPLE VI

Two grams of glucuronic acid from Aldrich Chemical were dissolved with stirring in 170 grams of water provided at room temperature. The glucuronic acid solution was placed in a high-shear mixer and agitation was commenced. To the glucuronic acid solution next was gradually added 40 grams of vital wheat gluten commercially available from Ogilvie Mills, Inc. under the WHETPRO-80 trademark. The temperature was allowed to rise due to the energy input of mixing. When the temperature reached 35° C., the gluten became soluble.

EXAMPLE VII

Two grams of glucuronic acid from Aldrich Chemical were dissolved with stirring in 170 grams of water provided at room temperature. The pH was raised to 5.75 by the addition of a small amount of sodium hydroxide solution. The glucuronic acid solution was placed in a high-shear mixer and agitation was commenced. To the glucuronic acid solution next was gradually added 40 grams of vital wheat gluten commercially available from Ogilvie Mills, Inc. under the WHETPRO-80 trademark. The temperature was allowed to rise due to the energy input of mixing. The gluten failed to solubilize throughout the working temperature range. Other Examples of algin, gum arabic, xanthan gum, and individual uronic acids and their ability to solubilize gluten are illustrated in TABLE I, below.

Comparison of Various Polysaccharides in their Ability to Solubilize Gluten

| Polysaccharide | Level (g) | Gluten (g) | Water (g) | Working Temp (°C.) | Solubility | Comments |
|---|---|---|---|---|---|---|
| Pectin* | 2 | 40 | 160 | 40–50 | Soluble | |
| Algin (sodium alginate) | 1 | 40 | 170 | 24–60 | Not | |
| Algin (sodium alginate) | 1.4 | 40 | 170 | 24–60 | Not | |
| Algin (sodium alginate) | 1.5 | 40 | 170 | 25–60 | Soluble | Sol at 45° C. |
| Algin (sodium alginate) | 2.0 | 40 | 170 | 25–50 | Soluble | Sol at 35° C. |
| Gum Arabic | 2.0 | 40 | 170 | 30–75 | Not | |
| Gum Arabic | 10 | 24 | 300 | 30–45 | Soluble | Sol at 30–45° C. |
| Gum Arabic | 16.7 | 40 | 170 | 40–45 | Soluble | Sol at 40–45° C. |
| Gum Arabic | 10 | 24 | 170 | 30–70 | Soluble | Sol at 30–70° C. |
| Xanthan Gum** | 1.5 | 40 | 170 | 24–50 | Soluble | Sol at 35–50° C. |
| Glucuronic Acid | 2 | 40 | 170 | 24–85 | Soluble | Sol 35–85° C.; pH 3.81 |
| Glucuronic Acid | 2 | 40 | 170 | 24–60 | Not | adjusted pH 5.75 |
| Galacturonic Acid | 2 | 40 | 170 | 24–70 | Soluble | Sol 35–70° C.; pH 2.41 |
| Galacturonic Acid | 2 | 40 | 170 | 24–70 | Not | adjusted pH 6.37 |

*Taken from copending CIP patent application, filed,
**TIC Gums

Table 1 illustrates the utility of the present invention: polysaccharides containing uronic acid residues are useful for solubilizing gluten without the need for pH adjustments to effect solubility. However, the monosaccharides alone, e.g glucuronic acid and galacturonic acid are usefill only when the pH is adjusted to either high or low pH to effect solubility as is already known in the art. Thus, these individual uronic acids are acidic enough in themselves to lower the pH enough to effect solubility.

We claim:

1. An improved process for solubilizing gluten in water to form a solution, wherein said gluten is contacted with an effective solubilizing concentration of a polysaccharide containing uronic acid residues, further provided that said process is conducted with high shear and agitation of the gluten and polysaccharide containing uronic acid residue mixture in water and at an elevated water temperature, wherein further, said elevated temperature is from 40° C. to 70° C., further provided that said effective solubilizing concentration of a polysaccharide containing uronic acid residues is 1–10 percent by weight of said solution and said gluten is 1–26 percent by weight of said solution.

2. An improved process for solubilizing gluten in water that normally is capable of absorbing water without dissolution according to claim 1 wherein said gluten is vital wheat gluten.

3. An improved process for solubilizing gluten in water that normally is capable of absorbing water without dissolution according to claim 1 wherein said gluten is corn gluten.

4. An improved process for solubilizing gluten in water that normally is capable of absorbing water without dissolution according to claim 1 wherein said polysaccharide that contains uronic acid residues is low methoxyl pectin.

5. An improved process for solubilizing gluten in water that normally is capable of absorbing water without dissolution according to claim 1 wherein said polysaccharide that contains uronic acid residues is gum arabic.

6. An improved process for solubilizing gluten in water that normally is capable of absorbing water without dissolution according to claim 1 wherein said polysaccharide that contains uronic acid residues is sodium alginate.

7. An improved process for solubilizing gluten in water that normally is capable of absorbing water without dissolution according to claim 1 wherein said elevated temperature is from 40° to 60° C.

8. An improved process for solubilizing gluten in water that normally is capable of absorbing water without dissolution according to claim 1 wherein said polysaccharide that contains uronic acid residues uronic is dissolved in said water in a concentration of approximately 1 to 3 percent by weight of the total solution.

9. An improved process for solubilizing gluten in water that normally is capable of absorbing water without dissolution to claim 1 wherein said gluten is dissolved in water in a concentration of approximately 19 to 22 percent by weight.

10. An improved process for solubilizing gluten in water that normally is capable of absorbing water without dissolution according to claim 1 wherein said polysaccharide that contains uronic acid residues is dissolved in said water in a concentration of approximately 1 to 3 percent by weight of the total solution, and said gluten is dissolved in said water in a concentration of approximately 19 to 22 percent by weight of the total solution.

11. An improved process for solubilizing vital wheat gluten in water that normally is capable of absorbing water without dissolution to form an edible solution comprising contacting said vital wheat gluten with agitation, with water provided an elevated temperature of at from 30° C. to 70° C. having an effective solubilizing concentration of a polysaccharide that contains uronic acid residues dissolved therein wherein said pectin is dissolved in said water in a concentration of approximately 1 to 10 percent by weight of the total solution and said vital wheat gluten is dissolved in said water in a concentration of approximately 1 to 26 percent by weight of the total solution.

12. An improved process for solubilizing vital wheat gluten that normally is capable of absorbing water without dissolution to form an edible solution according to claim 11 wherein said polysaccharide containing uronic acid residues is dissolved in said water in a concentration of approximately 1 to 3 percent by weight of the total solution and said vital wheat gluten is dissolved in said water in a concentration of approximately 19 to 22 percent by weight of the total solution.

13. An improved process for solubilizing vital wheat gluten that normally is capable of absorbing water without dissolution to form an edible solution according to claim 11 wherein said polysaccharide containing uronic acid residues is low methoxyl pectin.

14. An improved process for solubilizing vital wheat gluten that normally is capable of absorbing water without dissolution to form an edible solution according to claim 11 wherein said elevated temperature is from 40° to 60° C.

* * * * *